United States Patent [19]
Weyrauch et al.

[11] Patent Number: 5,089,911
[45] Date of Patent: * Feb. 18, 1992

[54] TELESCOPE HAVING IMAGE FIELD STABILIZATION

[75] Inventors: Adolf Weyrauch, Aalen; Peter Teichmann, Dänischenhagen; Dieter Werblinski, Kiel; Rudolf Rix, Heikendorf, all of Fed. Rep. of Germany

[73] Assignee: Carl-Zeiss-Stiftung, Heidenheim, Fed. Rep. of Germany

[*] Notice: The portion of the term of this patent subsequent to Jul. 9, 2008 has been disclaimed.

[21] Appl. No.: 454,352

[22] Filed: Dec. 21, 1989

[30] Foreign Application Priority Data

Dec. 24, 1988 [DE] Fed. Rep. of Germany ....... 3843775

[51] Int. Cl.$^5$ ............... G02B 27/64; G02B 23/00
[52] U.S. Cl. ................................ 359/554; 359/407
[58] Field of Search ........ 350/514, 566, 551, 500–506, 350/537–556, 145–146, 286–287; 464/98, 113, 115

[56] References Cited

U.S. PATENT DOCUMENTS

| | | | |
|---|---|---|---|
| 3,531,177 | 9/1970 | Akin, Jr. ............... | 350/551 |
| 3,969,933 | 7/1976 | Himmler ............... | 464/98 |
| 4,068,499 | 1/1978 | Sharp ............... | 464/115 |
| 4,312,560 | 1/1982 | Hale ............... | 350/550 |
| 4,346,960 | 8/1982 | Lehrmond et al. ............... | 350/546 |
| 4,465,346 | 8/1984 | Fraser ............... | 350/500 |
| 4,911,541 | 3/1990 | Alvarez et al. ............... | 350/500 |

FOREIGN PATENT DOCUMENTS

| | | |
|---|---|---|
| 1473901 | 12/1968 | Fed. Rep. of Germany . |
| 2239426 | 2/1974 | Fed. Rep. of Germany . |
| 2834158 | 2/1980 | Fed. Rep. of Germany . |
| 8714828 | 3/1988 | Fed. Rep. of Germany . |

OTHER PUBLICATIONS

"Gyro-Stabilized Binoculars", Power and Motoryacht, Aug. 1987.
Brochure Entitled "Inertial Sensors & Systems", British Aerospace Dyamics Group.

*Primary Examiner*—Bruce Y. Arnold
*Assistant Examiner*—Thong Nguyen
*Attorney, Agent, or Firm*—Walter Ottesen

[57] ABSTRACT

The invention relates to a binocular telescope having cardanically journalled inverting systems mounted on a symmetrical double holder. This double holder is connected via a spring joint to a stationary non-movable base frame which is mounted at the pivot point of both inverting systems. An active movement damping device provides for a field image stabilization in the telescope. The monolithic spring joint provides a spring action perpendicular to the optical axis with the springs being thickened in the axial direction toward the edge to improve supporting capability. Shock protection is provided in the region of the support pivot point and contains a releasable latching device. The active damping device consists of a magnet system movable relative to a current coil fixed to the housing. This current coil exhibits a nonlinear effect in order to axially adjust the damping constant. A magnet field sensor is located in the current coil and controls the current flow through the coils via a circuit so that a specific, time-limited change of the damping constant is possible.

12 Claims, 6 Drawing Sheets

TELESCOPE HAVING IMAGE FIELD STABILIZATION

FIELD OF THE INVENTION

The invention relates to a telescope of the binocular type wherein the inverting systems are mounted on a symmetrical double holder cardanically supported in two axes. The double holder is connected in the fixed axis with a non-movable base frame fixed to the housing. The double holder has a common support pivot point for both inverting systems.

BACKGROUND OF THE INVENTION

German Patent 2,834,158 discloses a prism telescope having image field stabilization. This prism telescope has two cardanically supported inverting prism systems wherein the supporting pivot point has the same spacing from the objective plane and the ocular plane. Two telescopes are combined to form a binocular device. The inverting prism systems of both telescopes are attached to a symmetrical double holder journalled so as to be rotatable in two directions. The double holder is connected to a non-movable carrier fixed to the housing and has a common supporting pivot point for both inverting prism systems. However, German Patent 2,834,158 provides no description as to the nature of the mounting.

Registered German Utility Model registration DE-GM 8,714,828 discloses a telescopic gunsight wherein an inverting system is attached to a monolithic spring joint. However, the inverting system is not attached so as to be freely pivotable by means of the spring joint in the housing of the telescopic gunsight and is not utilized for image field stabilization.

Furthermore, active damping arrangements are known which are however gyrostabilized and therefore have a very sensitive construction. In this connection, reference may be made to the following: German patent 1,473,901; U.S. Pat. No. 4,465,346; a publication of Fujinon Inc. in the journal "Power and Motor Yachting", Volume 8 (1987); and a publication of British Aerospace Public Limited Company, Dynamics Group, entitled "Inertial Sensors and Systems".

SUMMARY OF THE INVENTION

It is an object of the invention to provide an image field stabilized telescope wherein a reliable stabilization is provided notwithstanding a compact assembly.

The telescope of the invention is of the binocular type and has a housing and two optical inverting systems defining respective optical axes. The telescope includes: a symmetrical double holder for accommodating the inverting systems thereon; a rigid base frame connected to the housing of the telescope; a spring joint connecting the double holder and the base frame to each other and defining a support pivot point to permit cardanic movement of the double holder about the pivot point in two axes relative to the base frame; a damping device mounted on the double holder and the base frame for damping the movement of the double holder; and, the damping device having detection means for detecting the position of the double holder relative to the base frame and damping means for influencing this position in a predetermined manner.

The above telescope arrangement can reduce the frequency of the vibrating inverting systems while at the same time effect a damping of vibrations.

This binocular telescope having image field stabilization is distinguished by its very compact and simple configuration. This is achieved with the spring joint for supporting the inverting system in the support pivot point. In contrast to ball bearings, the spring joint exhibits no time-dependent change of the friction forces. Its constant damping characteristics make possible the use of a simple passive movement damping device for damping the movement of the double holder relative to a base frame with the double holder being attached to the spring joint with the position of the double holder relative to the base frame being determined and being specifically influenced with a force generator.

The spring joint is monolithic so that no spring clamping problems and thermal expansion problems occur. The supporting springs provided at the periphery of the joint act perpendicularly to the optical axis whereby an introduction of radial vibrations is prevented. The springs of the spring joint do not have a constant cross section so that they provide an improved supporting capability in the axial direction. The circular springs also permit an axial guide to be omitted and thereby minimize the overall dimensions. A further retaining spring is disposed at both ends of the supporting springs used for supporting the inverting system. These retaining springs take up the forces on the supporting springs during shock impacts in that they yield in a direction perpendicular to the optical axis until a mechanical stop is reached.

The retaining springs too do not have a constant cross section and are configured as circular arc springs. The retaining springs form a peripheral band at the periphery of the spring joint whereby the supporting springs are mounted in a spring parallelogram. The intermediate space between two mutually adjacent spring regions is connected by a free space with the individual free spaces being arranged so as to be spatially displaced from each other. These free spaces and the necessary cutouts for defining the springs conjointly assure the movability of the spring joint in the swing-out range which is intended to lie in the range between $\pm 1°$ to $10°$.

The spring joint has thickened edges at its end faces which are arranged perpendicularly to the optical axis. The parts which move relative to each other are attached to these edges. These parts are especially the base frame and the double holder. The base frame is connected to the telescope housing with threaded fasteners and constitutes an attachment location for part of the damping system. The other and heavier part of the damping system is attached to the double holder where this part acts as a counterweight for the inverting system by using the law of levers. This arrangement saves weight in the same manner as the simple assembly of the double holder and the base frame.

The binocular telescope can be subjected to rough treatment; that is, it can be subjected to very hard shocks. Accordingly, the retaining springs must be supported by a separate shock protective device. This is mounted in the interior of the spring joint in order to save space. The task of the shock protective device is to protect the spring joint against intense radial and axial shocks. The radial protection for the supporting springs is obtained by a stop cylinder which acts with respect to a rigid spherical surface with the relative movement of the two parts toward each other being without contact. The stop cylinder moves with the movement of the movable double holder. The spherical surface has its centerpoint in the pivot point of the spring joint. In this way, a radial stop (cylinder against sphere) is provided because of the radial resilience of the safety springs (spring parallelogram in the form of constrictions on the periphery of the joint). Accordingly, the supporting springs are not critically loaded in the radial direction. This protection is effective for each position of the double holder relative to the base frame. A corresponding action is possible against axial shocks by means of the spherical surfaces connected rigidly to the base frame fixed to the housing and configured so as to be concentric with respect to both sides of the pivot point. The spherical surfaces act during an axial shock as stop faces for screws threadably engaged in the double holder.

Since the severest shocks mostly do not occur during the use of the telescope, a fixing device for latching the image field stabilization can be so configured that it provides protection against intense rotational accelerations. This fixing device preferably comprises an axial rod displaceable in the shock safety device and having ends configured as truncated conical sections. With its ends, the rod can fix the double holder with respect to the base frame and assure a fixation which is free of axial forces. In the unlatched position, the rod does not pivot with the movable part of the shock safety device. The fixing device is provided with a reset device (such as a reset spring) so that the fixing device can automatically move back into the latched position.

The movements of the movable double holder with reference to the base frame are damped in the unlatched condition by the damping device. The damping arrangement can advantageously include high coercive, rotatably journalled permanent magnets and two fixedly mounted current coils having high conductivity and a magnetic-field sensor. These coils act in a nonlinear manner because of their configuration (variation of the coil thickness, coil form or coil material). In this way, the possibility is obtained for an axial adjustment of the damping constant especially while considering different torsion spring constants of the supporting springs whereby the manufacturing tolerances of the supporting springs do not affect the quality of the individually stabilized telescope.

The current coils are supplied with an adjustable current via a switch. The attachment of the magnet-field sensor on the coil assures a rigid arrangement and a simple configuration for which no parts must be mechanically pivoted in for changing the damping constant. This provides space as well as cost advantages and assures a robust and mechanically non-malfunctioning configuration of the damping system.

The damping system, is advantageously built up with at least one of each of the following: sensors, amplifiers and controllers.

In lieu of one or more controllers, a microprocessor can process the digitalized signals from an analog-to-digital converter and the microprocessor can process the movement changes through the output amplifier in correspondence to its program for a specific nonlinear course of the damping. The movement changes are detected by the magnetic-field sensors 76a (for example Hall sensors). This nonlinear course can then take place continuously or in steps in dependence upon the program. A self calibration of the zero point for the output amplifier and the spring constants can be effected by means of such a microprocessor. A single button actuation for unlatching, electrical activation and adjustment of damping can be obtained by means of different pressure on the switch and, as may be required, this pressure can be sensed by the resistance presented by a sequence of detents. Microprocessors of the kind referred to above are available as one-chip processors having an analog-to-digital converter, microprocessor, memory and output unit.

BRIEF DESCRIPTION OF THE DRAWINGS

The invention will now be described with reference to the drawings wherein:

FIG. 1c is a plan view of the spring joint of FIG. 1a;

FIG. 1d is a partial view of the periphery of the spring joint of FIG. 1a;

FIG. 2b is a plan view of the arrangement of FIG. 2a;

DESCRIPTION OF THE PREFERRED EMBODIMENTS OF THE INVENTION

Figure 1A:
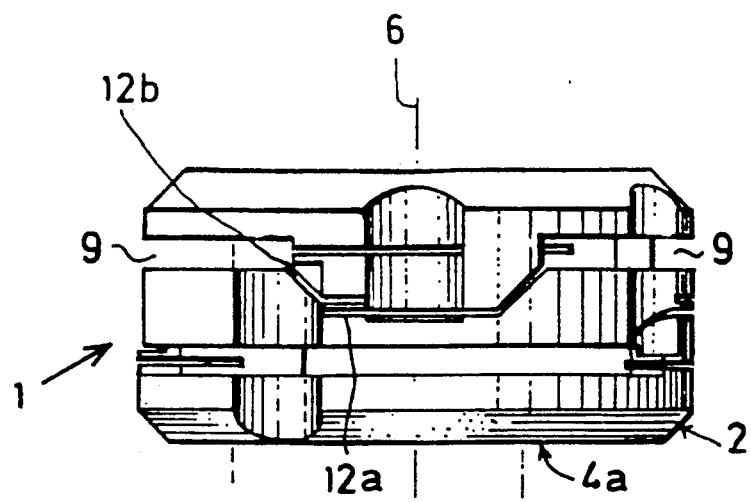
FIG. 1a is a side elevation view of the spring joint.
Figure 1B:
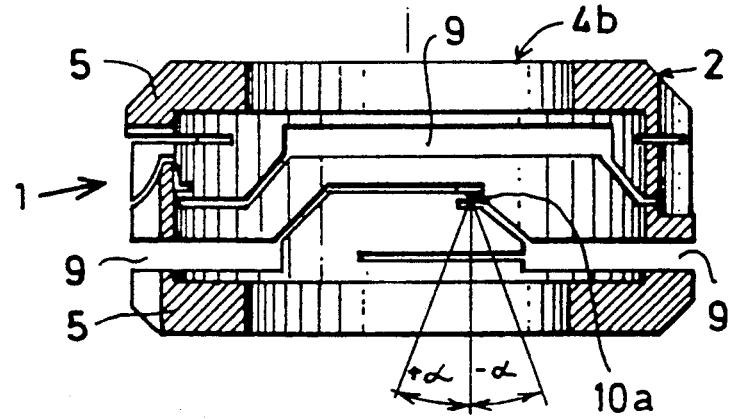
FIG. 1b is an elevation view, in section, taken along line Ib—Ib of FIG. 1c.
Figure 1C:
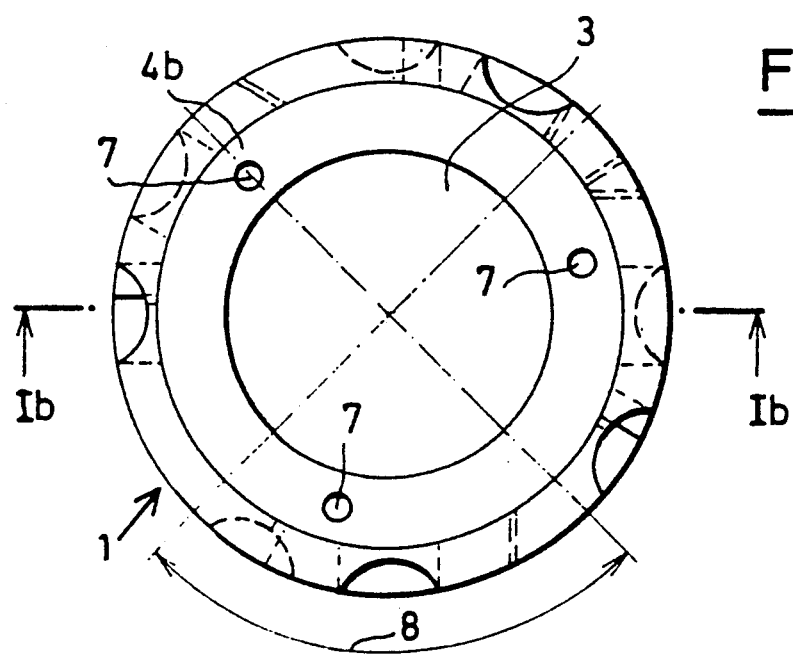
Figure 1D:
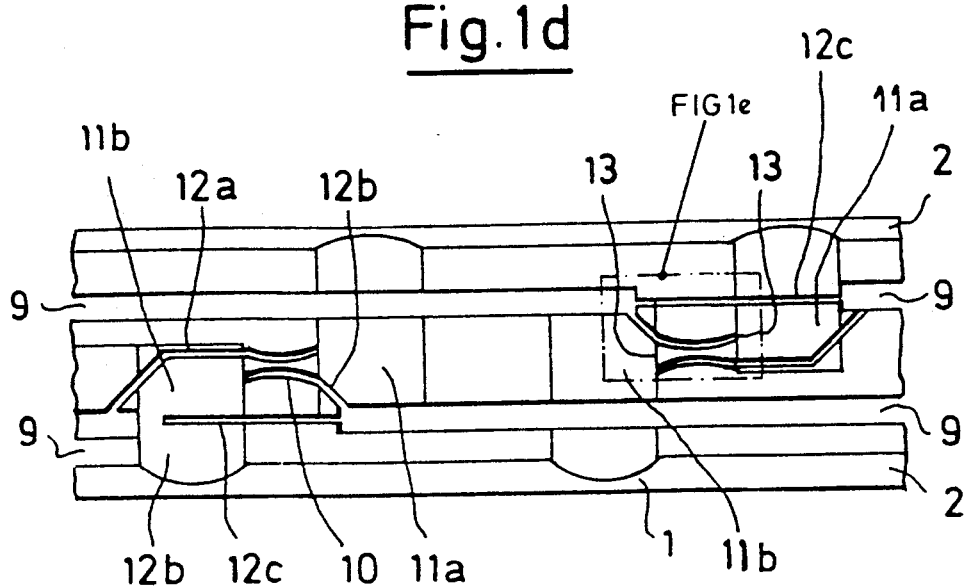
Figure 1E:
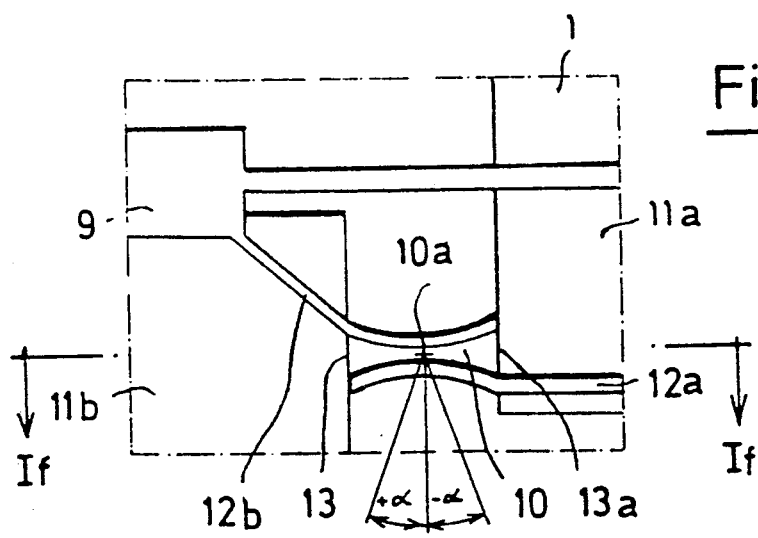
FIG. 1e is a detail view of a portion of three springs.

FIGS. 1a to 1f show the spring joint 1 which connects the base frame to the double holder. The spring joint 1 has constant damping characteristics since no friction forces occur which change in dependence on time such as in the case of ball bearings.

The spring joint 1 comprises a monolithic straight circular cylinder having edges 2 beveled at an angle of 45°. The circular cylinder is hollow in its interior 3 with the cover surfaces (4a and 4b) each being defined by a reinforced ring 5. Three threaded bores 7 parallel to the cylinder axis 6 are provided through the cover surfaces (4a and 4b) of the reinforcement rings 5 and are positioned at equal spacings from each other.

Four identically acting regions 8 are provided in the mid part of the circular cylinder and are uniformly distributed about the periphery. These regions 8 are connected via free spaces 9 parallel to the reinforcement rings 5. An essential element of each of these regions 8 are the three springs (10, 11a and 11b) and in this connection reference may be made especially to FIGS. 1e and 1f.

The center spring acts as support spring 10 and is defined by two cutouts (12a and 12b) which extend from the two lateral free spaces 9. These cutouts (12a and 12b) are arcuately configured in the region of the spring action so that a circular arc spring is provided which tapers toward the center. Because of its thicker spring ends (13, 13a), this supporting spring 10 has a carrying force improved in the axial direction and for this reason an axial guide is not required. The supporting spring 10 permits a tilt movement about the pivot axis 10a perpendicular to the cylinder axis 6 of the spring joint 1 within a range of ±α. The cutouts (12a and 12b) and the free spaces 9 are configured to be so wide that the tilt movement is not impeded within a selected angular range. Two supporting springs 10 lie opposite each other in respective regions 8.

Figure 1F:
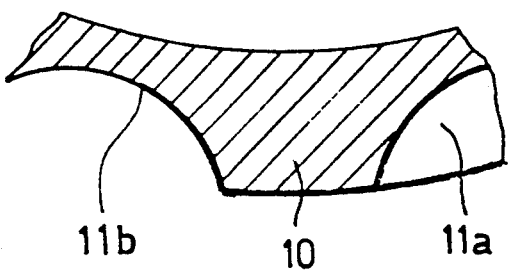
FIG. 1f is a detail view, in section and taken along line If—If of FIG. 1e of a portion having three springs.

The material of the cylinder periphery is thinned at both ends of the supporting spring 10 up to a spring thickness by removing material (see FIG. 1f). The material is removed in a direction parallel to the cylinder axis 6 and defines a semicircular shape when viewed in section. The retaining springs (11a and 11b) formed in this manner begin directly next to the center supporting spring 10 with a further cutout 12c being provided parallel to the reinforcement ring 5 for providing the one retaining spring 11b. This cutout 12c separates this spring 11b from the ring 5. This cutout 12c and the further cutout 12a conjointly limit the spring region of the retaining spring 11b. The retaining spring 11a is disposed at one end of the supporting spring 10. At the retaining spring 11a, the resilient region is separated axially from the material of the spring joint 1 by means of an upper and lower free space 9. The circular arc springs (11a and 11b) formed in this manner are now only connected laterally to the remaining material of the spring joint 1. The retaining springs (11a and 11b) act perpendicularly to the rotational axis 10a of the supporting spring 10 and perpendicularly to the cylinder axis 6. In this way, the retaining springs (11a and 11b) provide protection for the center supporting spring 10 against radial blows. The spring constant of the retaining springs (11a and 11b) is determined by the extent to which the center supporting spring 10 can be stressed against radial shock in the built-in condition.

Expanded free spaces 9 extend parallel to the outer rings 5 and the narrow cutouts (12a to 12c) terminate in these free space. These free spaces 9 begin at the end of the retaining springs (11a and 11b) facing away from the center supporting spring 10 and terminate at such an end when the longer cutout 12a for forming the center supporting spring 10 terminates therein. On the other hand, if the shorter cutouts 12b for forming the center supporting spring 10 terminate in the free spaces 9, then the free spaces 9 begin just ahead of the end of the supporting spring 11b facing toward the center supporting spring 10 and also terminate correspondingly.

The free spaces 9 connect the opposite-lying regions 8 and separate a supporting spring 11a from the reinforcement ring 5 because the free zones extend over a large angle. Two free spaces 9 are provided parallel to both reinforcement rings 5 with the upper free spaces 9 being angularly displaced with respect to the lower free spaces 9 by approximately 90°. This assures that the spring joint 1 can carry out a tilt movement in the selected angular range ±α. The springs (10, 11a, 11b) are provided once in each of the four regions 8.

The monolithic configuration of the spring joint 1 affords the advantage that no spring clamping problems and no thermal expansion problems occur from the use of different materials.

Figure 2A:
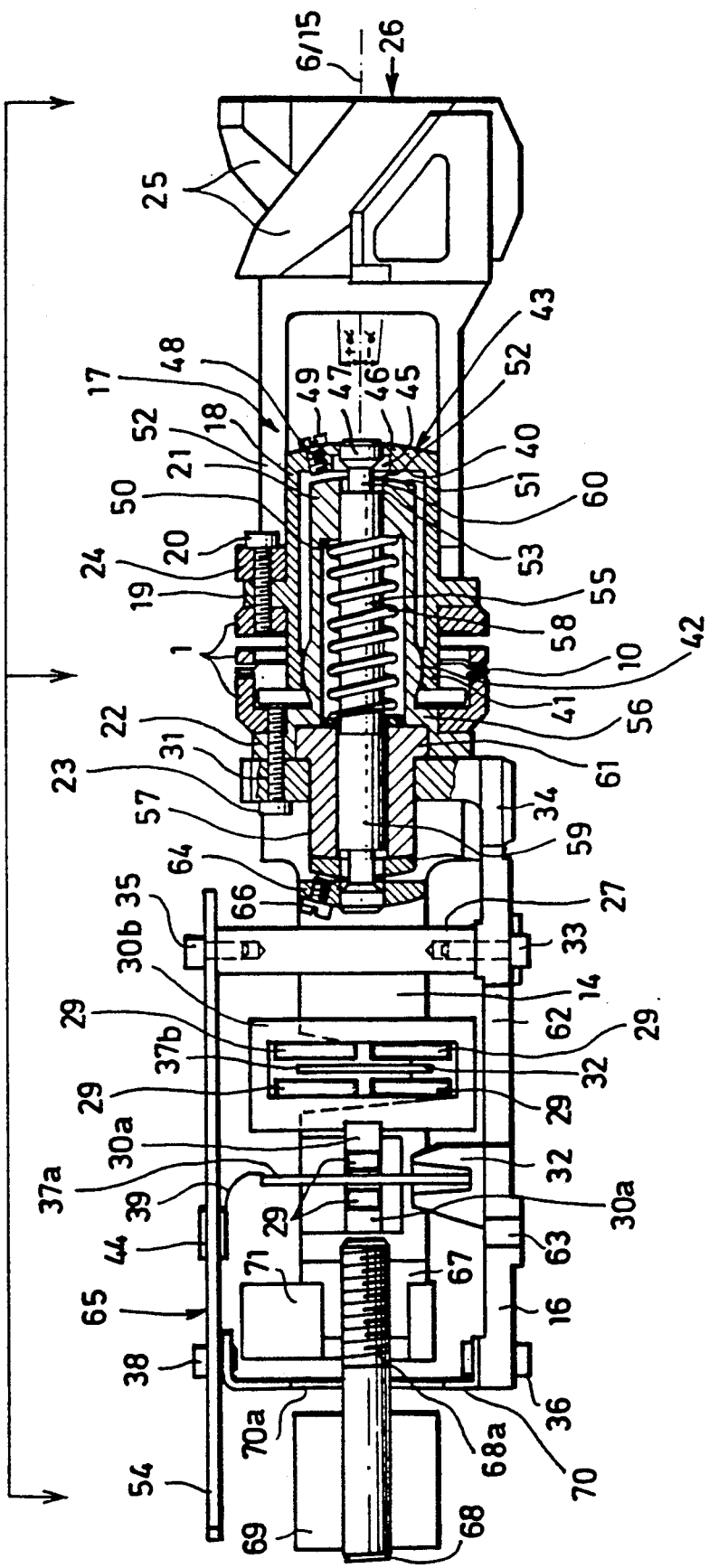
FIG. 2a is a side elevation view, partially in section, showing the built-in spring joint between the base frame and the double holder for the inverting system.
Figure 2B:
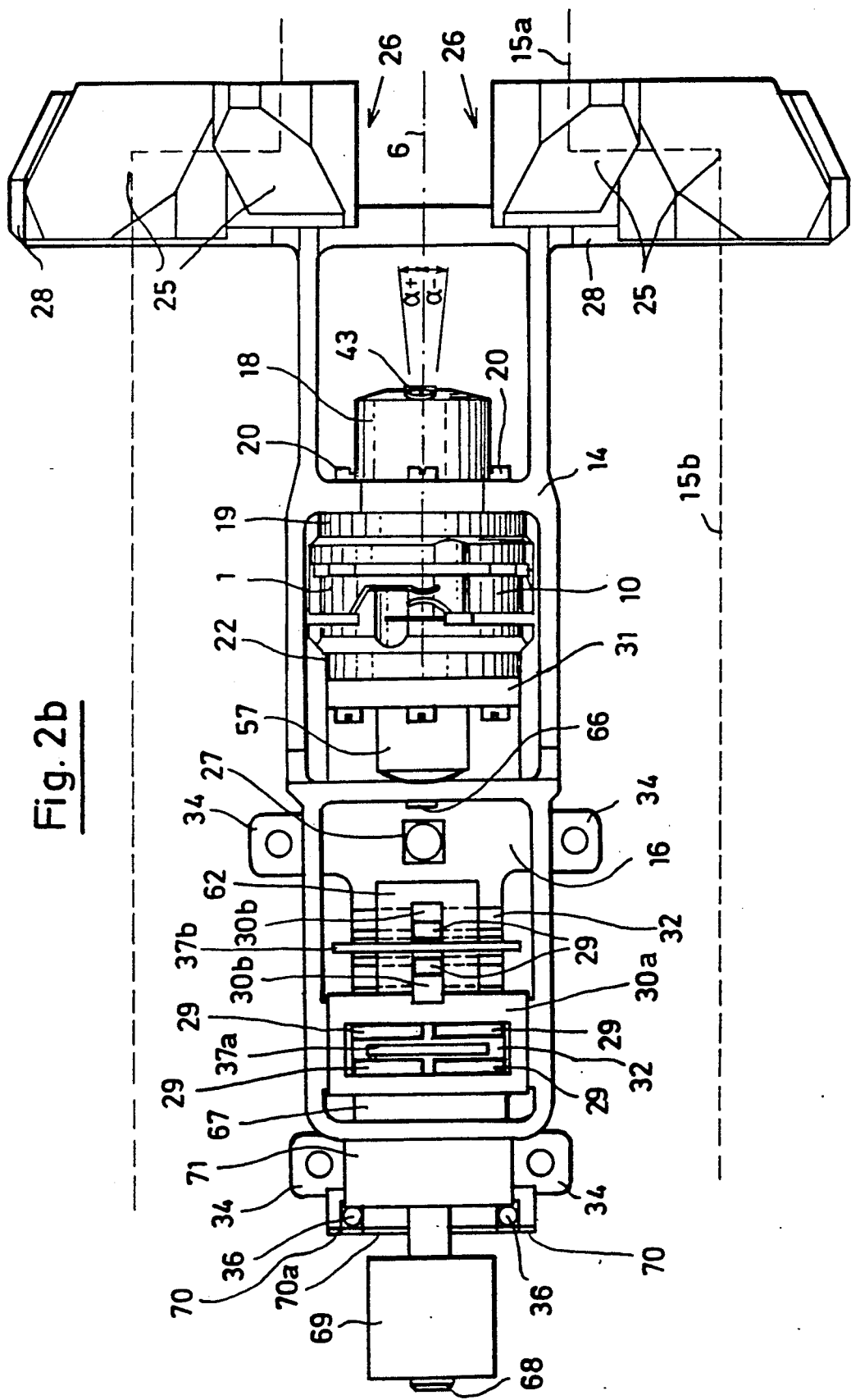

The spring joint 1 is shown in the built-in condition in FIGS. 2a and 2b. No radial vibrations are coupled into the movements of the movable double holder 14 because the supporting springs 10 act perpendicularly to the cylindrical axis 6 of the spring joint 1. The cylinder axis 6 extends parallel to the optical axes (15a and 15b).

The base frame 16 is connected to the telescope housing (not shown). The double holder 14 and the base frame 16 are connected via the spring joint 1 and an intermediate body 17 so as to be movable with respect to each other in a limited angular range ±α.

The double holder 14 is movably connected to the base frame 16 via the spring joint 1 and has two functions. As its first function, the double holder 14 carries the inverting systems 26 assembled from prisms 25 and, as its second function, the double holder 14 accommodates part of the passive movement damping device. The movable double holder 14 has two extension arms 28 for accommodating the two inverting prism systems 26 with the extension arms 28 being at the end of the holder facing toward the ocular. The optical axes (15a and 15b) are defined by the objectives (not shown) and the inverting prism systems 26. These axes (15a and 15b) run parallel to the symmetry axis 6 of the spring joint 1.

The movement damping device is mounted at the end lying opposite the extension arms 28. The movable double holder 14 is configured in this portion so that it can hold the magnets 29 of the active damping arrangement. The magnets 29 in the magnet holders (30a and 30b) form a counterweight to the inverting prism systems 26 on the extension arms 28 so that the movably mounted double holder 14 is held at its center of gravity with respect to the support at the spring joint 1.

The movable double holder 14 is made of lightweight metal and is constructively dimensioned so that it is as light as possible.

At one end, the spring joint 1 is connected to the flange 31 of the base frame 16 via the flange 22 of the stop body 21. The flange 31 is a right angle extension of the base frame 16 with the base frame 16 being constructively configured so as to ensure an unimpeded movement of the movable double holder 14 in the predetermined angular range ±α.

Four extension arms 34 are provided on the base frame 16 with the arms 34 being provided with respective bores. The base frame 16 is attached to the telescope housing (not shown) with threaded fasteners at these bores and a further bore 63 in the base frame 16. Planar mounting surfaces are provided about the bores at the lower side of the base frame 16 to ensure a reliable mounting of the base frame 16 when assembled into the telescope housing (not shown).

They are supported by means of further fixed counterweights (67, 71) and variable counterweights (68, 69) with the variability of the counterweights (68, 69) being achieved by means of a distance variation of the end piece 69 by means of the rod 68. The rod 68 is attached with a winding 68a in the fixed counterweight 67. The current carrying coils (30a, 30b) are rigidly connected to the base frame 16 via coil holders 32. The spacers (27, 70) hold the electronic board having the current supply. These spacers (27, 70) are fastened to the base frame 16 as well as to the electronic board 54 with the aid of screws (33, 36 and 35, 38). An opening 70a is provided in the rearward spacer 70 for the rod 68 of the counterweight 69 so that the double holder 14 can move without disturbance. For the same reason, the base frame 16 and the electronic board 54 have respective openings (62, 65). Terminals 44 are provided on the electronic board 54 for the current supply of the coils (30a, 30b) via cable 39 with only the cable 39 for the one coil 30a being shown in this view.

The base frame 16 and the movable double holder 14 are connected to the spring joint 1 via respective flanges (22, 19) of the intermediate unit 17. The intermediate unit 17 comprises essentially three parts:

(a) a guide body 18 having the lateral flange 19. The double holder 14 connected to the spring joint 1 is fastened at this flange 19 with a plurality of screws 20;

(b) a stop body 21 having the flange 22. The base frame 16 is connected to the spring joint 1 at this flange 22 with a plurality of screws 23; and, (c) a movable rod 55 which is disposed in the intermediate unit 17 and acts as a fixing device in the latched condition.

The guide body 18 comprises a circular cylinder open at its lower end with the circular cylinder having an inner cylindrical bore which terminates in a surface 40 at its closed end. The surface 40 is planar with respect to the cylinder axis 6. The inner cylindrical bore terminates at the open end in a constricted region 41 having a diameter which is only a few 1/10 mm greater than the radius of the outer surface of a spherically shaped thickening 42 of the stop body 21. These two surfaces lie opposite each other in the assembled condition.

The outer limiting face 43 of the closed end of the guide body 18 is slightly beveled toward the edge. A bore 45 about the cylinder axis 6 connects the planar surface 40 of the inner cylindrical bore with the outer limiting surface 43 with the bore 45 being reduced after a step 46 to the magnitude of the circular cylindrical ring about the rod head 47 of the rod 55. A threaded bore 48 passes through the outer limiting surface 43 in the peripheral region with the bore 48 being provided for the screw 49. The axis of the screw 49 intersects the cylindrical axis 6 at the location at which the spherical radius of the spherically shaped thickening 42 has its centerpoint.

The stop body 21 comprises a circular cylinder open at one end and having an inner cylindrical bore. At the closed end, the cylindrical bore terminates in a surface 50 planar to the cylindrical axis. The outer limiting surface 51 is spherically rounded off at the closed end with the centerpoint of the spherical radius being disposed on the cylindrical axis at that location where the cylindrically shaped thickenings 42 also has its centerpoint in the lower part of the circular cylinder. A bore 52 about the cylinder axis 6 connects the planar surface 50 of the inner cylindrical bore with the outer limiting surface 51 with the bore 52 having a step 53 which acts as a stop for the center portion of the movable rod 55.

The cylinder 21 extends into a collar 56 beyond the cylindrically shaped thickening 42 with the diameter of the inner cylindrical bore being increased for accommodating an insertable bushing 57. The collar end is configured as flange 22.

A rod 55 is introduced into the inner bore of the stop body 21 when the rod 55 is mounted and a wound spring 58 having a round cross section is disposed about the rod 55. A part 59 of the rod 55 is thickened and this part defines a stop for the spring 58 in the direction toward the inserted bushing 57. The rod 55 is pushed through the bore 52 of the stop body 21 up to the step 53 which serves as a stop for the center part of the movable rod 55. The rod 55 has a rod neck 60 which extends from the center part of the rod. In the position shown, only a part of the neck 60 and the rod head 47 on the neck extend beyond the outer limiting surface 51 of the stop body 21.

The rod 55 has a thickened segment 59 at the other end thereof. This thickened segment 59 is disposed inside the bushing 57 and the bushing 57 has a flange 61 which is held in the collar 56 of the stop body 21. In the latched condition shown in FIG. 2a, the spring 58 presses the rod 55 up to the step 53 into the bore 52 of the stop body 21. In this position, only a part of the neck 60a and the rod head 47a project beyond the outer limiting surface 62 of the bushing 57. This outer limiting surface 62 is spherically rounded with the centerpoint of the spherical radius being coincident with the centerpoint of the outer limiting surface 51 of the stop body 21.

The heads (47 and 47a) of the rod 55 are beveled on the ends facing toward and away from the respective neck segments (60 and 60a) so that only a cylindrical ring remains in the center of the heads (47 and 47a). In these regions, the rod 55 lies in the bore 45 of the guide body 18 and, at the other end, in the bore 63 of a fixing flange 64 which is attached to the movable double holder 14 with threaded fasteners so that the movable double holder 14 cannot move relative to the base frame 16 in this position of the rod 55, that is, the double holder 14 is latched. The end facing away from the bushing 57 is slightly thickened in the mid region. A threaded bore 65 passes through the surface of this end in the peripheral region and accommodates a screw 66 with the screw axis intersecting the cylinder axis 6 in the centerpoint of the spherical radius of the spherically shaped thickening 42 of the stop body 21. A movement along the axis 6 of the double holder 14 with respect to the base frame 16 is prevented by the screws (66, 49).

The bore 63 of the fixing flange 64 has a seat 44 on which the bore diameter is increased on the end facing toward the bushing 57.

The rod heads (47 and 47a) must be removed from the bores (45, 63) of the fixing flange 64 and of the guide body 18 so that the movable double holder 14 can move freely relative to the base frame 16 during use (see FIG. 2b). For this purpose, the rod 55 is pulled by a mechanism (not shown) connected to the telescope housing in the axial direction and through the fixing flange 64 until only the neck 60a is still disposed in the bore 63 of the fixing flange 64. The other rod head 47 is pulled out of the bore 45 against the force of the spring 58 in the direction of the stop body 21.

The movable double holder 14 can now move relative to the base frame 16 with this movement being damped primarily by the movement damping system 27. The clearance for movement is limited by the dimensions of the bore 63 of the fixing flange 64 and the diameter of the rod neck with an angular range $\alpha$ not being less than 2.5° in both directions of movement. With this structural configuration, the neck 60a movable in the bore 63 functions to simultaneously protect against intense rotational accelerations which could destroy the spring joint 1. When image field stabilization is no longer desired, one must only end the pull on the rod head 47a. The rod 55 then returns into its rest position under spring force.

If the rod 55 is latched into its latched position according to FIG. 2a, then the total stabilization arrangement is held so as to be free of axial forces.

Shock protection must be provided for each direction of movement so that the sensitive supporting springs 10 can withstand the hardest loads (shock, drop and the like) in the built-in condition. A shock protection against radial shocks in the unlatched condition is provided by the spherically shaped thickening 42 of the stop body 21. The constricted region 41 of the inner cylindrical bore surrounds the thickening 42. The thickening 42 is provided with a very small free spacing with respect to the region 41. In the interior of the joint, the spherically shaped thickening 42 is concentric with the supporting and pivot point of the spring joint 1 and can move without contact in the guide body 18 during normal operation.

The radial resilience of the spring joint 1 by the lateral protecting springs (11a and 11b) must be so dimensioned that a radial impact of the thickening 42 against the cylindrical constriction 41 occurs with a sudden load before the center supporting springs 10 of the spring joint 1 become critically loaded in the radial direction. The above-described impact occurs for each radial shock since the protective springs (11a and 11b) define a spring parallelogram on the periphery of the circular cylinder.

This impact protection is supplemented by a further impact protection against axial shock in the latched and unlatched condition. The screws (66, 49) mentioned above serve this purpose. The screws (49, 66) have respective longitudinal axes which, when extended, intersect the centerpoint of the spherical surfaces (51, 62) and the screws always have the same spacing from the spherical surfaces even during movement of the movable double holder 14 relative to the base frame 16 since the centerpoint of the spherical surfaces (51, 62) coincides with the pivot point.

The springs 10 of the spring joint 1 must yield only very slightly because of their axial resilience in the presence of an axial shock until the stop screws (49, 66) brace against the spherical surfaces (51, 62) and so protect the supporting springs 10 against critical load.

The use of an active damping arrangement affords the advantage that no friction forces occur which change with time. In this way, a system having constant damping characteristics is obtained by a simple and cost effective solution. The magnets 29 are attached to the movable double holder 14 and, with their relatively large mass, define a good counterweight to the prisms 25 and generate a very intense magnetic field (in the air gap 0.5 T) so that the air gap can be relatively large. Highly coercive permanent magnets made of rare earth cobalt (such as neodym iron or samarium cobalt) can be used as the magnets 29.

The fixedly mounted current coils (37a and 37b) have a high conductivity (copper coils) wherein currents can form during a movement of the magnets 29 relative to the coils (37a and 37b). The currents damp the movements of the pivot-spring rotating-mass system defined by the spring joint 1 and the movable double holder 14. The damping force is proportional to the current intensity.

Each current coil (37a and 37b) includes a freely supported coil for each direction of movement with current flowing through the coil. The coils can be supplied via a switch S1 on the telescope housing (not shown). This makes possible the formation of adjustable counter forces as required with the damping being adapted to the particular requirements without parts which have to be mechanically pivoted. This damping switchover is realized without further cost or space disadvantages. This is especially the case since the coils (37a and 37b) are themselves used as carriers whereby a very simple and functionally reliable configuration is obtained.

Figure 4:
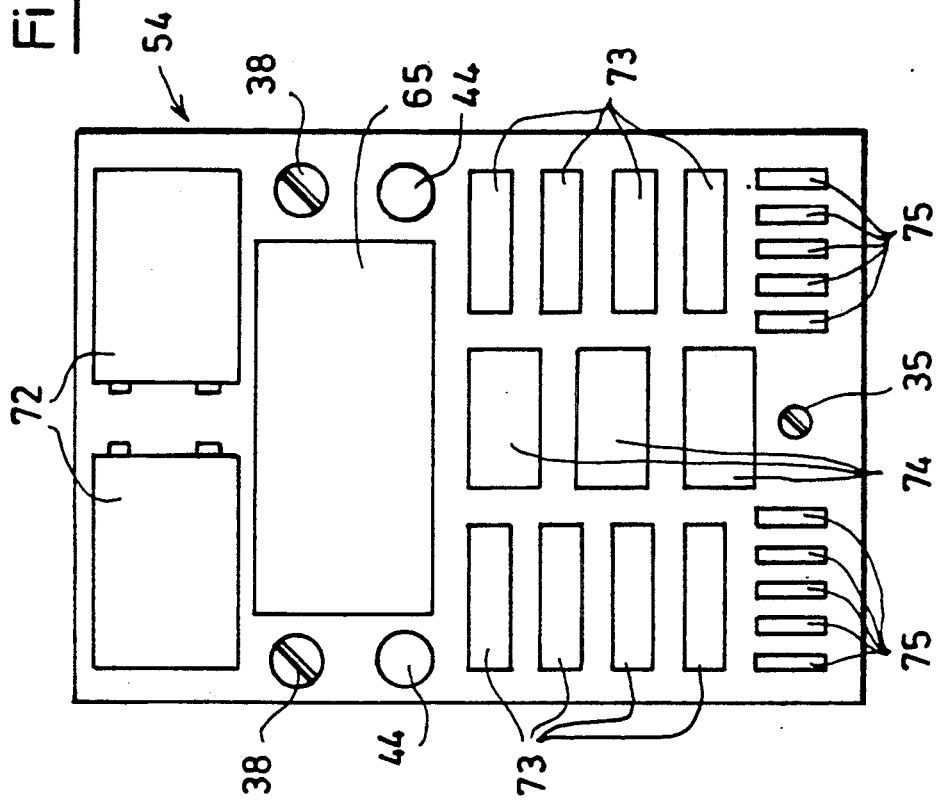
FIG. 4 is a detail view of the conductor plate.
Figure 3A:
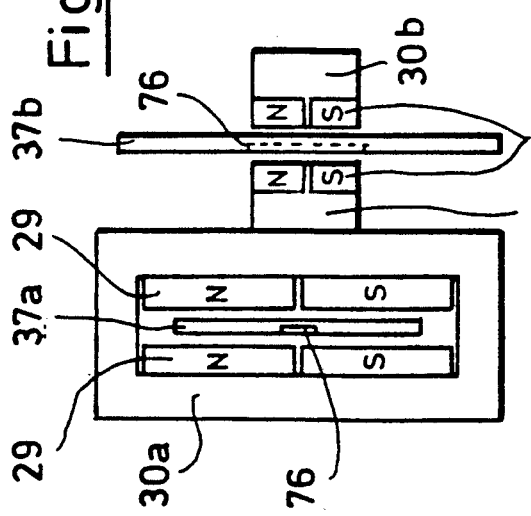
FIG. 3a is a detail view of the side elevation of the current coils.
Figure 3B:
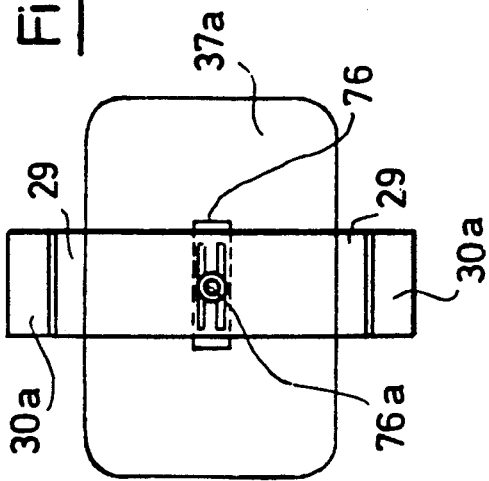
FIG. 3b is a detail view of the side of a current coil.

The movement-damping device is again shown with its most important components in FIGS. 3a and 3b. Only the magnets 29 with the magnet carriers (30a, 30b) are freely movable relative to the base frame 16. The coils (37a, 37b) and the magnet field sensor 76a mounted in the coils on a flexible conductor board 76 are rigid relative to the base frame 16. The relative movement of the movable double holder 14 relative to the base frame 16 through the 2×4 magnets can be detected by the magnet field sensor 76a for each magnet field sensor 76a on the basis of the alignment of the magnetic poles selected in a purposeful manner. The coils (37a and 37b) receive the current supply from the electronic card 54 shown in FIG. 4. The electronic card 54 accommodates the amplifier and controller integrated circuits 74 with the components 75 needed for the circuits which include resistors, condensers and the like. The electronic card 54 also accommodates the variable resistors 73 for making a basic adjustment as well as the voltage source 72. The electronic card 54 is attached with screws (35, 38) to the spacers (27, 70) and has an opening 65 to assure the free movement of the movable double holder 14.

Figure 5:
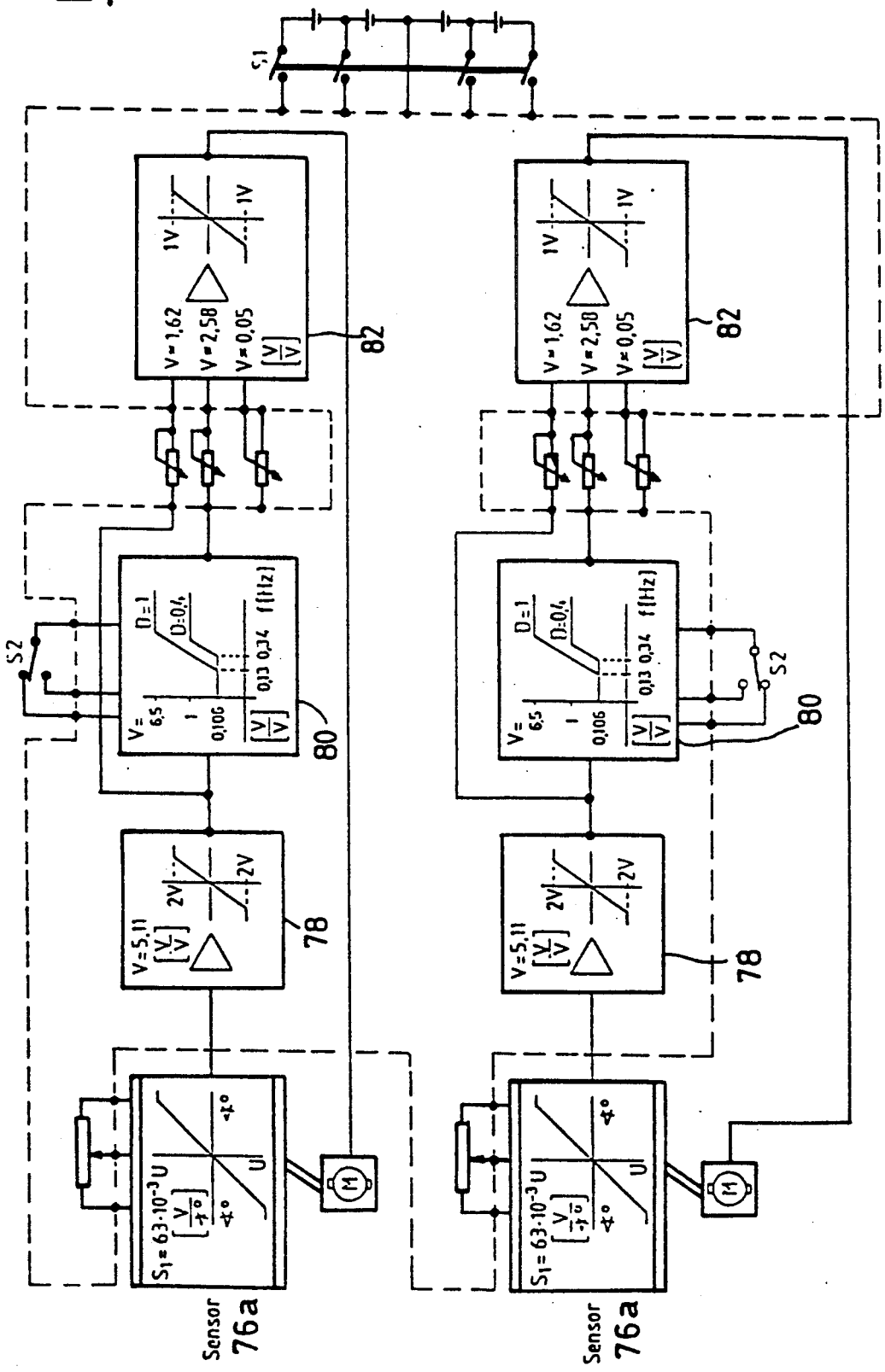
FIG. 5 is a schematic of the circuit block diagram for operating the arrangement shown in FIG. 2.

The operation of the circuit for the damping arrangement is shown in FIG. 5. The magnet field sensor 76a is adjusted via a zero balance. The detected signal from the magnet field sensor 76a reaches a preamplifier 78 and this preamplified signal is then applied to a controller 80 for controlling the damping. This controller 80 can be changed with respect to its damping characteristics by switch S2 which is accessible to the user of the telescope. The output signal of the controller 80 is then applied with a signal of the preamplifier 78 to an output amplifier 82 through a controllable resistor. The output amplifier 82 determines the coil current. The coil current provides a damping of the movement of the movable magnets 29 relative to the coils (37a, 37b) through which current flows and this is detected by the magnet field sensor 76a embedded in the coils. In this way, the control loop is closed. The movement damping is switched in via switch S1 which switches in the amplifier and sensor supply and unlatches the movable double holder 14 from the base frame 16.

In lieu of the controller or the controllers, a microprocessor can process the signals digitalized by an analog-to-digital converter and can provide a directed nonlinear course of the damping in correspondence to the movement changes detected by the magnetic field sensors 76a (for example, Hall sensors) and this can be done via the output amplifier in correspondence to the program of the microprocessor. This nonlinear course can take place pursuant to a particular program continuously or in steps. By means of such a microprocessor, the self calibration of the zero point for the output amplifier and the spring constants can be made. A single button actuation for unlatching, electrical activation and adjustment of damping can be obtained by means of different pressure on the switch and, as may be required, this pressure can be sensed by the resistance presented by a sequence of detents. Such microprocessors are available today as single-chip processors having the following: analog-to-digital converter, microprocessor, memory and output unit.

It is understood that the foregoing description is that of the preferred embodiments of the invention and that various changes and modifications may be made thereto without departing from the spirit and scope of the invention as defined in the appended claims.

What is claimed is:

1. A telescope of the binocular type having two optical inverting systems defining respective optical axes, the optical axes defining an optical plane, the telescope comprising:

a symmetrical double holder for accommodating the inverting systems thereon;

a rigid base frame subjected to vibrations applied thereto during use of the telescope;

a cardanic spring joint non-rigidly connecting said double holder and said base frame to each other for isolating said double holder from said vibrations, said spring joint defining a support pivot point to permit cardanic movement of said double holder about said pivot point in two axes relative to said base frame and said optical plane;

said spring joint including a plurality of springs arranged radially of said support pivot point to cause said cardanic movement to be substantially uniform along said two axes;

a damping device mounted on said double holder and said base frame for damping said movement; and, said damping device including detection means for detecting the position of said double holder relative to said base frame and damping means for influencing said position in a predetermined manner.

2. The telescope of claim 1, said spring joint being a monolithic unit.

3. The telescope of claim 1, said spring joint defining a longitudinal axis passing through said pivot point; and, said telescope further comprising releasable latching means for latching said double holder to said base frame to prevent said movement.

4. The telescope of claim 3, further comprising a shock protective device mounted in surrounding relationship to said support pivot point; and, said latching means being mounted in said shock protective device.

5. A telescope of the binocular type having two optical inverting systems defining respective optical axes, the telescope comprising:

a symmetrical double holder for accommodating the inverting systems thereon;

a rigid base frame;

a spring joint connecting said double holder and said base frame to each other and defining a support pivot point to permit cardanic movement of said double holder about said pivot point in two axes relative to said base frame;

a damping device mounted on said double holder and said base frame for damping said movement;

said damping device including detection means for detecting the position of said double holder relative to said base frame and damping means for influencing said position in a predetermined manner; and, said damping means including a magnet system mounted on said double holder for moving therewith; and, a coil means fixedly mounted on said base frame; and, said detection means being a magnetic field sensor mounted on said coil means.

6. The telescope of claim 5, said coil means being a coil having a varying thickness whereby said coil acts nonlinearly.

7. A telescope of the binocular type having two optical inverting systems defining respective optical axes, the telescope comprising:

a symmetrical double holder for accommodating the inverting systems thereon;

a rigid base frame;

a spring joint connecting said double holder and said base frame to each other and defining a support pivot point to permit cardanic movement of said double holder about said pivot point in two axes relative to said base frame;

a damping device mounted on said double holder and said base frame for damping said movement;

said damping device including detection means for detecting the position of said double holder relative to said base frame and damping means for influencing said position in a predetermined manner; and, said spring joint defining a plurality of supporting springs arranged so as to be aligned perpendicularly to said optical axes.

8. A telescope of the binocular type having two optical inverting systems defining respective optical axes, the telescope comprising:

a symmetrical double holder for accommodating the inverting systems thereon;

a rigid base frame;

a spring joint connecting said double holder and said base frame to each other and defining a support pivot point to permit cardanic movement of said double holder about said pivot point in two axes relative to said base frame;

a damping device mounted on said double holder and said base frame for damping said movement;

said damping device including detection means for detecting the position of said double holder relative to said base frame and damping means for influencing said position in a predetermined manner; and, said spring joint including a plurality of springs and each of said springs having a thin mid-region and thickened end-regions on respective ends of said mid-region.

9. A telescope of the binocular type having two optical inverting systems defining respective optical axes, the telescope comprising:

a symmetrical double holder for accommodating the inverting systems thereon;

a rigid base frame;

a spring joint connecting said double holder and said base frame to each other and defining a support pivot point to permit cardanic movement of said double holder about said pivot point in two axes relative to said base frame;

a damping device mounted on said double holder and said base frame for damping said movement;

said damping device including detection means for detecting the position of said double holder relative to said base frame and damping means for influencing said position in a predetermined manner; and, said damping means including a microprocessor for influencing the movement of said double holder in a predetermined manner.

10. A telescope of the binocular type having two optical inverting systems defining respective optical axes, the telescope comprising:

a symmetrical double holder for accommodating the inverting systems thereon;

a rigid base frame;

a spring joint connecting said double holder and said base frame to each other and defining a support pivot point to permit cardanic movement of said double holder about said pivot point in two axes relative to said base frame;

a damping device mounted on said double holder and said base frame for damping said movement;

said damping device including detection means for detecting the position of said double holder relative to said base frame and damping means for influencing said position in a predetermined manner; and, a shock protection device mounted in surrounding relationship to said support pivot point.

11. The telescope of claim 10, said spring joint defining an interior surrounding said pivot point and said shock protective device being mounted in said interior and in the region of said pivot point.

12. A telescope of the binocular type having two optical inverting systems defining respective optical axes, the optical axes defining an optical plane, the telescope comprising:

a symmetrical double holder for accommodating the inverting systems thereon;

a rigid base frame subjected to vibrations applied thereto during use of the telescope;

a single cardanic spring joint non-rigidly connecting said double holder and said base frame to each other for isolating said double holder from said vibrations, said spring joint defining a support pivot point to permit cardanic movement of said double holder about said pivot point in two axes relative to said base frame and said optical plane;

said spring joint including a plurality of springs arranged radially of said support pivot point to cause said cardanic movement to be substantially uniform along said two axes;

a damping device mounted on said double holder and said base frame for damping said movement; and, said damping device including detection means for detecting the position of said double holder relative to said base frame and damping means for influencing said position in a predetermined manner.

* * * * *